US012755371B2

(12) United States Patent
Laudereau et al.

(10) Patent No.: US 12,755,371 B2
(45) Date of Patent: Oct. 6, 2026

(54) METHOD FOR ANALYSING THE OPTICAL QUALITY OF A GLAZING ELEMENT, METHOD FOR CALIBRATING A CAMERA, GLAZING ELEMENT THUS ANALYSED

(71) Applicant: SAINT-GOBAIN GLASS FRANCE, Courbevoie (FR)

(72) Inventors: Jean-Baptiste Laudereau, Paris (FR); Theo Rybarczyk, Margny-les-Compiegne (FR); Tatiana Severin-Fabiani, Cachan (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 289 days.

(21) Appl. No.: 18/575,674

(22) PCT Filed: Jun. 28, 2022

(86) PCT No.: PCT/FR2022/051287
§ 371 (c)(1),
(2) Date: Dec. 29, 2023

(87) PCT Pub. No.: WO2023/275486
PCT Pub. Date: Jan. 5, 2023

(65) Prior Publication Data
US 2024/0320818 A1 Sep. 26, 2024

(30) Foreign Application Priority Data
Jun. 30, 2021 (FR) ....................................... 2107080

(51) Int. Cl.
*G06T 7/00* (2017.01)
*G06T 7/11* (2017.01)
(Continued)

(52) U.S. Cl.
CPC ............ *G06T 7/001* (2013.01); *G06T 7/0004* (2013.01); *G06T 7/11* (2017.01); *G06T 7/74* (2017.01);
(Continued)

(58) Field of Classification Search
CPC ... G06T 7/001; G06T 7/11; G06T 7/80; G06T 2207/10024; G06T 2207/20212;
(Continued)

(56) References Cited

U.S. PATENT DOCUMENTS 12,130,244 B2 * 10/2024 Rybarczyk ........... G01N 21/958
2012/0207380 A1 * 8/2012 Le Moal ................ G01B 11/25 382/141
(Continued)

FOREIGN PATENT DOCUMENTS

CN 106600642 A * 4/2017 ............... G06T 5/80
EP 3293701 A1 * 3/2018 ............... G06T 7/97
(Continued)

OTHER PUBLICATIONS

Dixon, Michael, et al. "Measuring optical distortion in aircraft transparencies: a fully automated system for quantitative evaluation." Machine Vision and Applications 22.5 (2011): 791-804. (Year: 2011).*
(Continued)

*Primary Examiner* — Sumati Lefkowitz
*Assistant Examiner* — Ryan P Potts
(74) *Attorney, Agent, or Firm* — CUSHMAN PARTNERS, LLC

(57) ABSTRACT

A method analyzes optical quality of a glazing region using images of a reference pattern. A first reference image of a first fixed reference pattern is provided or acquired without the glazing, and a first distorted image of the first reference pattern is acquired with the glazing positioned between an
(Continued)

Figure 1:
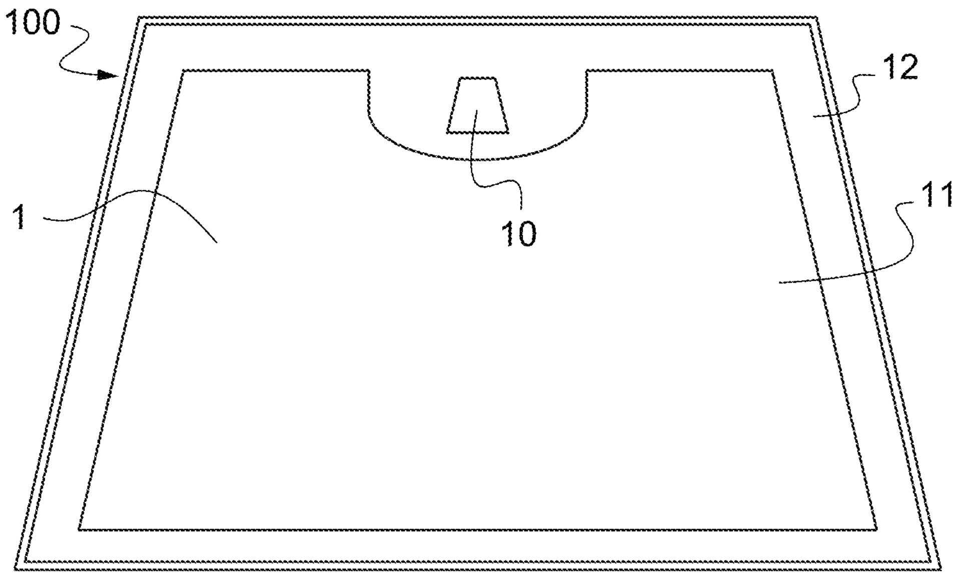

optical image acquisition device and the first reference pattern. A second reference image of a reference pattern is provided or acquired without the glazing, and a second distorted image of the reference pattern is acquired with the glazing positioned between the optical image acquisition device and the reference pattern, the reference pattern being located at a distance different from the first reference pattern. Image points are generated on the reference and distorted images, first and second apparent displacement fields are calculated, and a simulated apparent displacement field is determined for a third distance different from the first and second distances.

20 Claims, 12 Drawing Sheets

(51) Int. Cl.

| | |
|---|---|
| ***G06T 7/73*** | (2017.01) |
| ***G06T 7/80*** | (2017.01) |
| ***G06V 10/75*** | (2022.01) |
| ***G06V 20/56*** | (2022.01) |

(52) U.S. Cl.
CPC .............. *G06T 7/80* (2017.01); *G06V 10/757* (2022.01); *G06V 20/56* (2022.01); *G06T 2207/10024* (2013.01); *G06T 2207/20212* (2013.01); *G06T 2207/30244* (2013.01); *G06T 2207/30252* (2013.01)

(58) Field of Classification Search
CPC ......... G06T 2207/30252; G06T 7/0004; G06T 7/74; G06T 2207/30244; G06V 20/56; G06V 10/757
See application file for complete search history.

(56) References Cited

U.S. PATENT DOCUMENTS

| | | | | |
|---|---|---|---|---|
| 2021/0283994 | A1* | 9/2021 | Wilson | F24F 11/86 |
| 2021/0389240 | A1* | 12/2021 | Labayrade | G01N 21/55 |

FOREIGN PATENT DOCUMENTS

| | | | | | |
|---|---|---|---|---|---|
| WO | WO-2020115170 | A1 * | 6/2020 | | B32B 7/023 |
| WO | WO-2020165232 | A1 * | 8/2020 | | C03C 23/007 |
| WO | WO-2021050882 | A1 * | 3/2021 | | G01N 21/958 |
| WO | WO 2021/063847 | A1 | 4/2021 | | |
| WO | WO-2021110901 | A1 * | 6/2021 | | G01J 9/02 |

OTHER PUBLICATIONS

International Search Report as issued in International Patent Application No. PCT/FR2022/051287, dated Oct. 28, 2022.

Wu, B., et al., "A Flexible Method for Zoom Lens Calibration and Modeling Using a Planar Checkerboard," Photogrammetric Engineering & Remote Sensing, Jun. 2013, XP055901696, pp. 555-571.

* cited by examiner

Fig.14
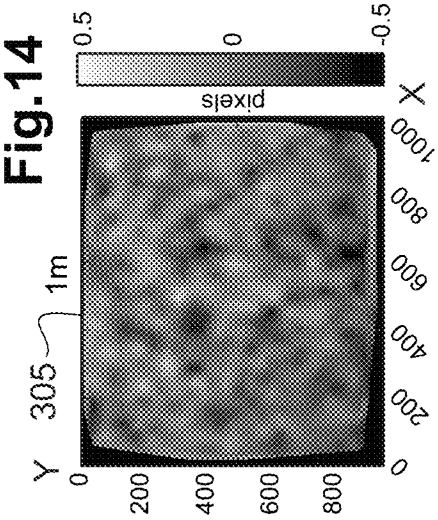
Fig.12
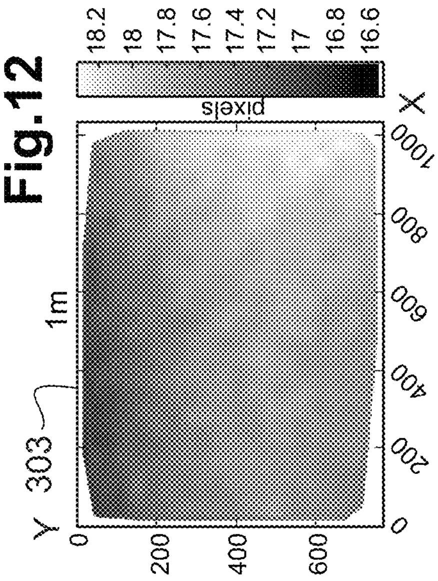
Fig.10
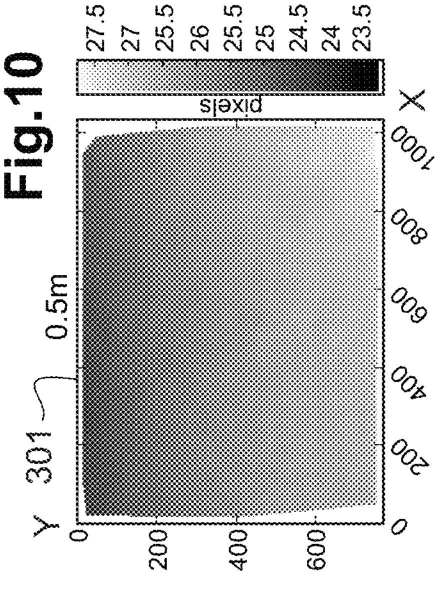
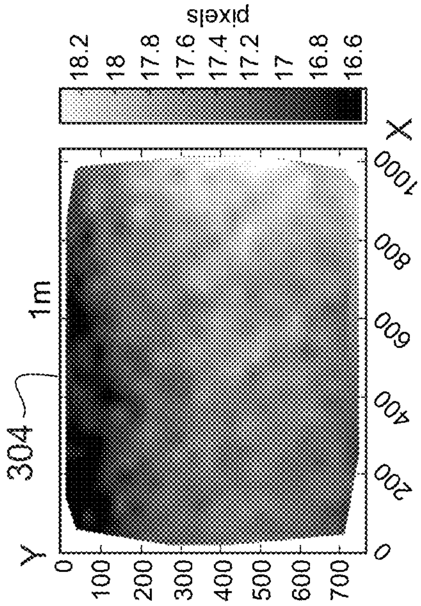
Fig.13
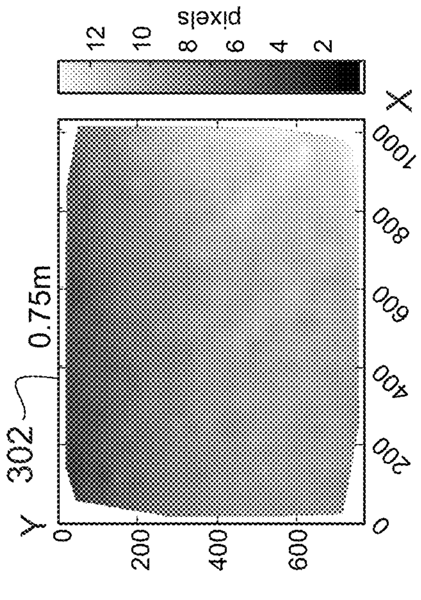
Fig.11

Fig.17
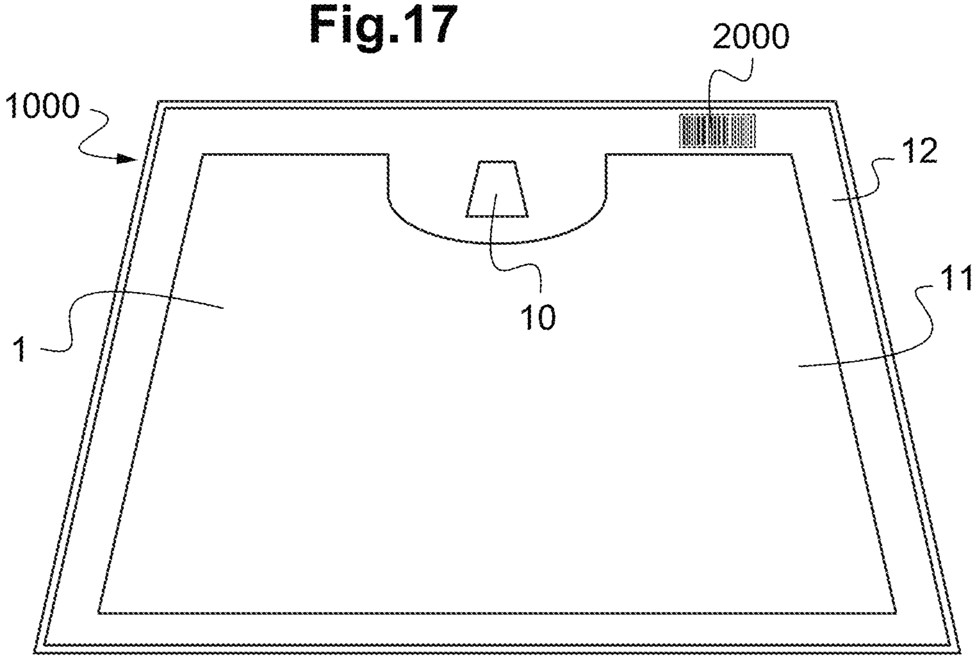
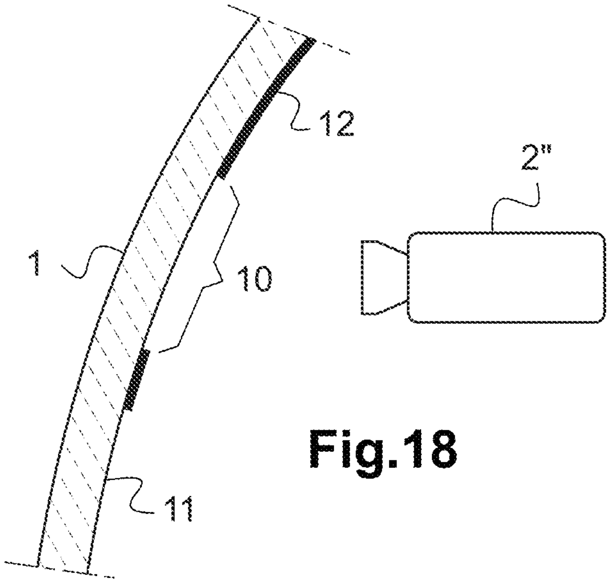
Fig.18

METHOD FOR ANALYSING THE OPTICAL QUALITY OF A GLAZING ELEMENT, METHOD FOR CALIBRATING A CAMERA, GLAZING ELEMENT THUS ANALYSED

CROSS-REFERENCE TO RELATED APPLICATIONS

This application is the U.S. National Stage of PCT/FR2022/051287, filed Jun. 28, 2022, which in turn claims priority to French patent application number 2107080 filed Jun. 30, 2021. The content of these applications are incorporated herein by reference in their entireties.

The invention relates to a method of analyzing the optical quality of a region of a glazing, said region being intended to be placed in front of an acquisition or measurement device such as a camera. The invention thus relates to a method of calibrating a camera based on said analysis method and to a glazing thus analyzed.

The invention is particularly suitable for measuring the optical quality of a delimited area of a transport vehicle glazing, such as a car or aircraft windshield, in front of which an optical image recording device or a device for measuring the external environment of the vehicle is placed for the operation of an advanced driver assistance system of said vehicle.

Advanced driver assistance systems (ADAS) are being used in more and more transport vehicles, including motor vehicles. Among other functionalities, these on-board systems can provide real-time information on the state of road traffic and/or on the state of the vehicle's mechanical and/or electrical equipment and features, assess the driver's state of fatigue or distraction, detect and anticipate possible threats from the vehicle's external environment, or assist the driver in carrying out certain difficult maneuvers such as passing other vehicles or parking.

In order to function, these systems integrate numerous devices or sensors that collect data on the driver, the vehicle and/or their environment. Some systems, such as parking assistance systems, autonomous driving systems, or collision avoidance systems, use one or more optical image acquisition devices or devices for measuring the vehicle's external environment. These devices are generally placed in the vehicle enclosure, behind one of the glazings of said vehicle, said glazing then generally having a protective function for this device. They can also be directly incorporated into the glazing, for example between two glass sheets in a laminated glazing, one of which is provided with a cavity to accommodate it.

The glazing can be any of the usual glazing of the vehicle: windshield, rear window, side windows. Most often the optical devices are placed behind the windshield to acquire information from the front of the vehicle.

The information or data acquired by the devices, such as images in the case of optical recording devices, are processed by on-board systems to obtain the desired functionality. In order for advanced in-vehicle systems that use optical recording devices or measuring devices placed behind glazings to function optimally, it is necessary that the data acquired by said optical devices be reliable, that is free of artifacts. Also, said glazings must have a sufficient optical quality in order to avoid defects and/or optical aberrations such as aberrations of sphericity, chromatism, astigmatism, coma.

These devices, in particular the devices located at the windshield, are generally placed behind inclined glazings and, in the majority of the cases, in an area of the glazings delimited by decorative features that hide from the view from outside of the vehicles the features of said devices except their active features for the acquisition of the images or the measurement of any other parameter. The delimited zones can also comprise on their surface functional features which are directly placed in the field of acquisition or measurement of the acquisition or measurement devices. These features can, for example, be networks of heating wires with different geometries, or functional layers with optical or thermal properties. These functional features also cause optical distortions.

Glazings comprising a delimited zone intended to be placed in front of an acquisition or measurement device are manufactured before said device is integrated. It is therefore necessary to check the optical quality of the delimited area in order to prevent the presence of optical distortions from being the cause of damaging artifacts in the images or signals acquired by these devices.

The state of the art discloses numerous methods for testing or measuring the optical quality of glazings, in particular vehicle windshields.

It is known to analyze the optical quality of an entire windshield by analyzing images of a reference pattern.

However, if it is a question of measuring the quality of a delimited area of a glazing in relation to an optical camera with a high Angular Field Of View (AFOV), which would require the positioning of a gigantic reference pattern. For example, at 5 m for a horizontal AFOV of 100° the pattern would have to be more than 10 m wide, which is difficult to integrate in an industrial line. The pattern would be cumbersome and would have to be adjusted to each optical camera model.

A further object of the invention is to propose a method of analysis of the optical quality of a region of a glazing (with or without holes) without the above-mentioned disadvantages, and thus easier to implement industrially (pattern at a shorter distance than the working distance-detection distance of the object etc-, simple equipment at a reasonable price which is used for any type of camera, whatever the working distance, etc.) without sacrificing the accuracy of measurement.

Thus, a first object of the invention is to propose a method for analyzing the optical quality of a region of a glazing (in particular curved and/or laminated), in particular of a land, rail or aeronautical vehicle, in particular a windshield of a motor vehicle, that region covering all or part of the surface of the glazing, in particular a region forming a limited zone (transmission window) intended to be placed in front of an acquisition or measurement device (ADAS), possibly in this region the glazing having a through-hole filled by an insert (transparent at the working wavelength of the ADAS) or a partial hole (on the inner glass sheet of a laminated glazing) possibly with an insert (transparent at the working wavelength of the ADAS), based on image analysis of a reference pattern comprising:

1) a (first) digital image acquisition step comprising:
   - acquisition of at least one (digital) image of a first fixed (and illuminated) reference pattern M1 comprising a first set of (contrasting) patterns extending in two dimensions (X, Y orthogonal, in particular Y vertical axis), preferably 2D patterns—in particular on a first (in particular flat) panel—, at a distance L1 of at least a centimeter and preferably at most 5 m from an optical device for acquiring (digital) images along the optical axis (Z) of the optical device, in particular at least 10 or 50 or better at least 100 patterns in the field of view, acquisition thus comprising, in any order, the following sub-steps:

1a) providing a first reference image $I_1$, theoretical or acquired, of the first reference pattern M1 (simulated or physical) preferably in the field of view of the optical device, in the absence of said glazing, 1'a) the glazing being placed between the optical device and the first reference pattern M1, with said surface region in the field of view of the optical device, the acquisition of a first distorted image $I'_1$ of said first reference pattern M1 (physical), particularly said image distortion being induced by said region, the glazing tilted at a first angle preferably identical to the angle of the glazing or +/−5° or +/−1° when mounted in a vehicle acquisition of at least one image of a fixed (and illuminated) reference pattern Mi chosen from the first reference pattern M1 or another reference pattern M2 comprising a second set of (contrasting) patterns extending in two dimensions (Y' Z')—preferably 2D patterns—in particular on a second panel (in particular a plane panel), the reference pattern Mi at a distance L2 being distinct from L1 of the optical device, and preferably L2-L1 in absolute value is at least 1 cm or 10 cm or 20 cm, the acquisition thus comprising, in any order, the following sub-steps:

1b) providing a second reference image $I_2$, theoretical or acquired, of the reference pattern Mi (simulated or physical) preferably in the field of view of the optical device, in the absence of said glazing 1'b) the glazing being placed between the optical device and the reference pattern Mi, with said region in the field of view of the optical device, the acquisition of a second distorted image $I'_2$ of the (physical) reference pattern Mi, preferably the glazing inclined at a second angle preferably identical or substantially identical to the first angle the following sub-steps: 1a) to 1'b) being in any order, with the possible acquisitions 1a) and 1b) being simultaneous and/or with the acquisitions 1'a) and 1'b) being potentially simultaneous.

Concerning the reference images I1, I2, they can be pre-recorded acquired images (acquired well in advance), theoretical images (simulated by computer) or images acquired in the same sequence of acquisitions as the distorted images I'1, I'2.

As long as the stability of the optical line is ensured, it is possible to use the first theoretical or acquired reference image I1 (or the second theoretical or acquired image I2) and then to make a series of acquisitions of distorted images with different glazings (in a “batch”) in succession for the first reference pattern M1 and for the reference pattern Mi.

After or as images are acquired 1), the method comprises:

2) a step of generating image points in pixels (points marked on the images) which are:

first points ($K1_i$) of the first reference pattern M1 (marked) on the first reference image I1 corresponding to physical or simulated points ($J1_i$) of the first reference pattern M1 (simulated points if theoretical I1)

first other so-called offset points ($K'1_i$) of the first reference pattern M1 (marked) on the first distorted image I'1 corresponding to the same points ($J1_i$) of the first reference pattern M1 second points of the reference pattern Mi ($K2_i$) (marked) on the second image I2 corresponding to physical or simulated points ($J2_i$) of the reference pattern Mi second other so-called offset points ($K'2_i$) of the second reference pattern M2 (marked) on the first distorted image I'2 corresponding to the same points ($J2_i$) of the reference pattern Mi.

In particular, the image points are preferably points of interest (or noteworthy points) of the patterns, or points that are in particular central to portions of a region containing a recognizable pattern. The image points can be in any area of the image that we are able to locate on the reference image I1 and on the distorted image I'1 (respectively I2 and I'2).

After or during step 2), the method comprises:

3) a step of determining, by calculation, a field of first apparent displacements, in pixels, between each first point ($K1_i$) and its other first offset point ($K'1_i$) and a field of second apparent displacements, in pixels, between each second point ($K2_i$) and its corresponding second offset point ($K2_i$).

After step 3) it comprises:

4) a step of determining (predicting) by calculating, using the fields of the first and second apparent displacements, a field of simulated apparent displacements (in pixels) of points, for a (any) distance L3 distinct from L1 and L2 of a reference pattern (comprising patterns extending in two dimensions, for example M1 or M2) with the optical device along the optical axis.

The method according to the invention thus makes it possible to deduce, to predict a field of simulated apparent displacements for a distance L3 which can be very large from measurements and calculations of apparent displacement fields at distances L1, L2 chosen as desired.

The simulated field of apparent displacements provides information on the quality of the glazing and will allow the calibration of a camera, that is the correction of distortions on the image in real time.

For better measurement accuracy, the glazing can preferably be tilted with respect to the optical axis of the digital optical device at an angle corresponding to the angle intended in the use of said glazing in a vehicle, and the angle is identical during 1'a) and 1'b).

In the method according to the invention, steps 1) and 2) and 2) and 3) can be intertwined. An image is needed for analysis, but the analysis of this image can start during the supply or acquisition of other images I'1, I2 etc.

The reference pattern M1 or M2 carrier panels are not necessarily strictly in a plane orthogonal to the optical axis. The distance L1 and L2 are measured along the optical axis, between the camera and the point on the reference pattern that intersects the optical axis.

Each reference pattern is illuminated by any known means: backlighting, side lighting (spotlights, ambient light).

Each reference pattern is fixed (immobile during acquisition).

The patterns are discernible. The patterns are opaque or transparent, colored or colorless, identical or distinct.

The patterns can be disjointed.

The patterns can be of any shape, geometrical (disc, oval etc) of size adapted to the resolution sought and depending on the size of the pixels of the sensors of the optical device.

The patterns can form a regular and even periodic arrangement of disjointed patterns: an array with a given mesh shape (square, hexagonal, etc.).

The reference pattern can be a tiling of two different colored patterns (rectangular, square etc) that alternate; for example, the reference pattern can be a checkerboard of black and white, or colored and transparent.

For better 2D rather than 1D information, 2D patterns are preferred as opposed to 1D patterns that extend substantially in one direction such as a straight line or wavy like a sinusoid.

Advantageously, in order to limit measurement errors, the sub-steps 1'a) and 1'b) are carried out without moving the glazing relative to the optical device and even without moving the glazing and the optical device, the sub-steps 1'a) and 1'b) being at least successive and preferably simultaneous when Mi is the second reference pattern M2.

In one embodiment, Mi is the second reference pattern M2, with the first reference pattern M1 obscuring the reference pattern M2, with L2>L1 (M1 being closer to M2 of the optical device), the sub-steps 1b) and 1'b) are in the absence of M1. In particular, sub-steps 1a) (for example acquisition substep) and 1'a) (for example acquisition substep) are in the presence or absence of M2.

In step 1) when the reference pattern (M1 or M1) is a checkerboard or an array of aligned patterns, it can be arranged that each line of patterns is misaligned with the line of pixels of the acquisition device.

The acquisition device used for the invention can be based on one or more sensors sensitive to different parts of the electromagnetic spectrum, that is in the visible range but also outside the visible range, in particular in the ultraviolet (UV) or below or in the infrared (IR) range, in particular the near infrared or the far infrared and beyond. For a non-visible application, the first reference pattern M1 (if chosen to be not simulated for the reference image) and, if necessary, the reference pattern M2 and their illuminations are chosen so that these reference patterns and the patterns that constitute them are imaged in a contrasting manner by the acquisition device used so that each step of the invention can be carried out.

The light emitted, reflected or scattered by the reference patterns M1 or M2 and captured by the optical device can be in spectral ranges S1 and S2 which can be equal, partially overlapping or completely discrete.

S1 and S2 are not necessarily in the visible.

In an advantageous embodiment, Mi is the second reference pattern M2, and the acquisitions in step 1) are in the presence of M1 and M2.

The optical device can be selected to be polychromatic:

- in a spectral range in the visible with several sensitive channels in at least two different spectral ranges S'1 and S'2 in the visible,
- or in another spectral range outside the visible (IR, UV) with several sensitive channels in at least two different spectral ranges S'1 and S'2 outside the visible (IR, UV etc).

M1 can be colored with a color Co1 (corresponding to a spectral range S1, that is M1 emits, scatters or reflects light in the spectral range S1).

M2 can be colored with a color Co2, Co2 being distinct from Co1 (corresponding to a spectral range S2 distinct from S1 that is M2 emits, scatters or reflects light in the spectral range S2).

In particular the device is polychromatic, the first distorted image I'1 (and the first reference image I1 acquired) containing patterns of color C'1 and the second distorted image I'2 (and the second reference image I2 acquired) containing patterns of color Co'2 distinct from Co'1.

In particular, the patterns of M1 are colored with a color C1, the patterns of M2 are colored with a color Co2 distinct from C1, the colors Co1 and Co2 being digitally rendered by the polychromatic image acquisition device by colors Co'1 and Co'2 (the rendered color is not necessarily the real color).

In this last embodiment, to save more time and to eliminate the need to take off or move the reference pattern M1, the acquisitions of the sub-steps 1'a) and 1'b) are simultaneous, and the possible acquisitions of the sub-steps 1a) and 1b) are simultaneous.

The first distorted image I'1 (in particular colored with the color Co'1) and the second distorted image I'2 (in particular colored with the color Co'2 different from Co'1) are combined into a first common distorted image I'1*c* (in particular colored with two colors Co'1 and Co'2), before step 3) the first common image I'1*c* is segmented in such a way that the images I'1 and I'2 (in particular colored with the color Co'1 and Co'2) are obtained.

Potentially, the acquired first reference image I1 (in particular colored with the color Co'1) and the acquired second reference image I2 (in particular colored with the color Co'2 distinct from Co'1) are combined in a common (reference) image I1*c* and before step 3), the common (reference) image I1*c* is segmented in such a way as to obtain the (reference) images I1 and I2 in particular colored with the color Co'1 and Co'2).

In a configuration with a double reference pattern M1 and Mi=M2, the digital acquisition device is not focused on one of the reference patterns in particular (if necessary, a certain blurring is allowed on the image of one or more reference patterns).

In one embodiment, the method comprises a so-called predictive mapping in any pixel of the so-called simulated apparent displacements p3, in particular if necessary by interpolation (linear, polynomial) of the first and second apparent displacements.

The so-called predictive mapping can be obtained from a first mapping of the first displacements at any pixel and a second mapping of the second interpolated displacements at any pixel, in particular mappings directly obtained using an image correlation.

The so-called predictive mapping can be obtained from a first mapping of the first interpolated displacements and a second mapping of the second interpolated displacements.

In the latter embodiment, the calculation of each apparent displacement p3 (for L3) at any pixel is obtained from the following formula:

$$p_3 = \gamma_3\left(\frac{p_1}{\gamma_1} + \frac{L_3 - L_1}{L_2 - L_1}\left(\frac{p_2}{\gamma_2} - \frac{p_1}{\gamma_1}\right)\right) \quad \text{[Math 1]}$$

wherein $\gamma_1$ $\gamma_2$ and $\gamma_3$ are the magnitudes defined by:

$$\gamma_1 = \frac{f_0}{f_0 - L_1} \text{ and} \quad \text{[Math 2]}$$

$$\gamma_2 = \frac{f_0}{f_0 - L_2} \quad \text{[Math 3]}$$

$$\gamma_3 = \frac{f_0}{f_0 - L_3} \quad \text{[Math 4]}$$

fo being the focal length of the optical device $p_1$ being the first apparent displacement at any pixel $p_2$ being the second apparent displacement at any pixel.

In an embodiment, step 2) comprises an (automatic) detection of points, in particular by means of techniques known to the skilled person of image processing, in particular with sub-pixel detection of the points, in particular:

2a) detecting a physical or simulated point of origin O1 of the reference pattern M1 marked by coordinates (preferably Cartesian) on the first reference image I1 (acquired or theoretical)

2b) detecting said point of origin O1 of the reference pattern M1 marked by coordinates (preferably Cartesian) on the first distorted image I'1

2c) detecting said first (image) points which are points of interest K1 representative of the patterns of the first reference pattern M1 on the first reference image I1

2d) detecting the first other (image) points which are points of interest K'1 representative of the patterns of the first reference pattern M1 on the first distorted image I'1

2'a) detecting another physical or simulated point called the other point of origin Oi of the reference pattern Mi marked by coordinates on the second reference image I2 (acquired or theoretical), 2'b) detecting said other point of origin Oi of the reference pattern Mi marked by coordinates on the second distorted image I'2, 2'c) detecting the second (image) points which are points of interest K2 representative of the patterns of the reference pattern Mi on the second image I2

2'd) detecting the second other points which are points of interest K'2 representative of the patterns of the reference pattern Mi on the second distorted image I'2 and after or as the detection proceeds, (automatically) ordering the (first, first other and second, second other) points of interest K1 to K'2

2e) the first points of interest K1 being ordered with respect to the point of origin O1 located on the first reference image I1 (acquired or theoretical), 2f) the first other points of interest K'1 being ordered with respect to the point of origin O1 located on the first distorted image I'1

2'e) the second points of interest K2 being ordered with respect to the other point of origin Oi located on the second image I2 (acquired or theoretical), 2'f) the second other points of interest K'2 being ordered with respect to the other point of origin Oi located on the second distorted image I'2.

The detections may potentially be completely or partially simultaneous, in particular the detections 2a) and 2b) or 2c and 2d) or 2'a) and 2'b) or 2'c and 2'd) may potentially be simultaneous The point of origin O1 or O2 can coincide with a point of interest and be located at the same time.

The detections 2'a) and 2'a) or 2b) and 2'b) or 2c) and 2'c) or 2d) and 2'd) are possibly simultaneous, in parallel and preferably performed after segmentation as described later.

Ki can be ordered in parallel with other image processing. It is possible to begin ordering some of the points already detected and continue the detection for others.

After or as ordering is being completed, the method may comprise:

(automatically) forming first (K1, K'1) and second (K2, K'2) pairs of the ordered points of interest, each first pair comprising a first point of interest K1 and (its) first other offset point of interest K'1, each second pair comprising a second point of interest K2 and (its) second other offset point of interest K'2.

In this method, point matching is used to determine the apparent displacements. The first and second apparent displacements correspond to the difference between the coordinates of the image points K1, K'1 and K2, K'2

Preferably, at least 100 first and second pairs are formed, which correspond to physical points distributed on the reference pattern in a regular or irregular manner and in a sufficient mesh to scan the glazing region.

The formation of the first and second pairs can be done simultaneously, in parallel (after the segmentation detailed later).

In particular, the points of interest are selected from:

points in intersection lines of a grid reference pattern or between tiling patterns of the reference pattern M1 or Mi for example corners of a square pattern of a checkerboard, with alternating transparent colored square patterns with the color Co1 or Co2 and transparent and colorless square patterns centroids of patterns forming a (regular, preferably periodic) array of (punctual) patterns, preferably identical, disjointed from the first reference pattern M1 or Mi, particularly distributed so as to sufficiently mesh the detection zone, opaque or transparent patterns with the color Co1 or Co2.

Alternatively to the method involving points of interests (marked by sub-pixel resolution), step 2) can be based on digital image correlation, the first pattern M1 has preferably random or pseudo-random patterns, the reference pattern Mi has preferably random or pseudo-random patterns and comprises:

comparing image portions of the first reference image I1 with the first distorted image I'1 or conversely comparing distorted image portions of the first distorted image I'1 with the first reference image I1, preferably the first points are the centers C1 of the image portions and the first offset points are the centers C'1 of the distorted image portions.

comparing image portions of the second reference image with the second distorted image I'1 or conversely comparing distorted image portions of the second distorted image I'2 with the second reference image I2, the second points are preferably the centers C2 of the image portions, the second offset points are the centers C'2 of the distorted image portions.

The invention also relates to a method of calibration (of real-time corrections of distorted images) of an optical camera (in the visible, LIDAR, thermal camera, etc.) placed in the passenger compartment of a vehicle in the field of view of a region of said vehicle glazing forming a camera zone analyzed according to the analysis method described above, said calibration using the mapping of simulated apparent displacements, in particular in such a way as to compensate, on the images of the optical camera, for the effects of refraction (shift, distortion) of the luminous radiation through the region of said glazing.

The working distance is the distance of the camera from a detection object outside the passenger compartment.

The invention also relates to a vehicle, in particular an autonomous or semi-autonomous vehicle, comprising the glazing thus analyzed and said camera thus calibrated, in particular a camera positioned to receive light radiation passing through the glazing through said region forming a camera zone, which camera is chosen from: a camera in the visible or in the infrared, in particular LIDAR; or a thermal camera.

The invention also relates to a road or rail vehicle glazing, which incorporates a data storage device in the form of a data matrix or a bar code which refers to a database, the database containing the mapping of the simulated apparent displacements, in particular the data storage device is on the glazing, in particular at the periphery, in particular printed on the glazing, etched (by laser etc.) or stuck to the glazing.

The invention also relates to a vehicle, in particular an autonomous or semi-autonomous vehicle, comprising the glazing and a device for acquiring images in the passenger compartment, in particular an optical camera positioned to receive light radiation passing through the glazing through said region forming a camera zone, the camera being chosen from among: a camera in the visible, in the infrared, in particular LIDAR; or a thermal camera.

The glazing according to the invention can be laminated, and comprise:

- a first glass sheet intended to be the exterior glazing, with a first external main face F1 and a second internal main face F2 oriented toward the passenger compartment
- a lamination interlayer made of polymer material, referred to as interlayer material, with a main face Fa oriented toward F2 and a main face Fb opposite Fa, in particular polyvinyl butyral PVB (acoustic and/or in a corner, etc.)
- a second glass sheet intended to be the interior glazing with a third main face F3 on the side of F2 and a fourth internal main face F4 oriented toward the passenger compartment.

For example, the camera is an infrared vision system with a working wavelength in the near infrared (LIDAR, etc.) located in the passenger compartment behind said glazing and comprising a transmitter and/or receiver so as to send and/or receive radiation passing through the first glass sheet, possibly with a through-hole (4), in the thickness of the second glass sheet, the through-hole being centimetric, and either closed or open.

For example, the camera is an infrared vision system with a working wavelength in the far infrared, placed in the passenger compartment behind said glazing and facing a transparent insert with a working wavelength housed at the level of a hole passing through the glazing.

Some advantageous but non-limiting embodiments of the present invention are described hereafter, which of course can be combined as appropriate.

The invention relates to a method for analyzing the optical quality of a (preferably limited) region of a preferably curved glazing (for example along at least one or two radii of curvature) based on image analysis of a reference pattern, which comprises a number of steps with sub-steps, in particular:

1) a first digital image acquisition step comprising:
  - an acquisition of at least one image of a first fixed reference pattern M1 comprising a first set of patterns extending in two dimensions, at an at least centimetric distance L1 from an optical device for image acquisition along the optical axis of the optical device, the acquisition thus comprising in any order the following sub-steps:

1a) providing a first reference image $I_1$, theoretical or acquired, of the reference pattern M1 preferably in the field of view of the optical device, in the absence of said glazing, 1'a) the glazing being placed between the optical device and the first reference pattern M1, with said surface region in the field of view of the optical device, the acquisition of a first distorted image $I'_1$ of said first reference pattern M1,
  - acquiring at least one image of a fixed reference pattern M1 selected from the first reference pattern M1 or another reference pattern M2 comprising a second set of patterns extending in two dimensions, the reference pattern Mi being at a distance L2 distinct from L1 of the optical device along the optical axis of the optical device, the acquisition thus comprising, in any order, the following sub-steps:

1b) providing a second reference image $I_2$, theoretical or acquired, of the reference pattern Mi, preferably in the field of view of the optical device, in the absence of said glazing 1'b) the glazing being placed between the optical device and the reference pattern Mi, with said region in the field of view of the optical device, the acquisition of a second distorted image $I'_2$ of the reference pattern Mi.

Preferably, the sub-steps 1'a) and 1'b) are carried out without moving the glazing relative to the optical device and even without moving the glazing and the optical device, the sub-steps 1'a) and 1'b) being at least successive and preferably simultaneous when Mi is the second reference pattern M2.

In one case, Mi is the second reference pattern M2, where L2>L1, the first reference pattern M1 obscuring the reference pattern M2, the sub-steps 1b) and 1'b) being in the absence of M1.

In another case, Mi is the second reference pattern M2, the acquisitions of step 1) are in the presence of M1 and M2, preferably successive or simultaneous acquisitions of the sub-steps 1'a) and 1'b), in particular the device is polychromatic, the first distorted image I'1 containing patterns of color Co'1 and the second distorted image I'2 containing patterns of color Co'2 distinct from Co'1.

In particular, the acquisitions of the sub-steps 1'a) and 1'b) are simultaneous, the possible acquisitions of the sub-steps 1a) and 1b) are simultaneous and the first distorted image I'1 and the second distorted image I'2 are combined on a distorted common image I'1*c*, before step 3) the common image I'1*c* is segmented so as to obtain the images I'1 and I'2 and, if necessary, the first reference image I1 and the second reference image I2 are combined to form a common image I1*c* and, before step 3), the common image I1*c* is segmented so as to obtain the images I1 and I2.

After or as images are acquired 1), the method comprises:

2) a step of generating image points which are:
  - first points of the first reference pattern M1 on the first image I1 corresponding to physical or simulated points of the first reference pattern M1
  - first other so-called offset points of the first reference pattern M1 on the first distorted image I'1 corresponding to the same points of the first reference pattern M1
  - second points of the reference pattern Mi on the second image I2 corresponding to physical or simulated points of the reference pattern Mi
  - second other so-called offset points of the second reference pattern M2 on the second distorted image I'2 corresponding to the same points of the reference pattern Mi.

In one embodiment, step 2) may involve point detection, including sub-pixel detection of points, 2a) detecting a physical or simulated point called the point of origin of the reference pattern M1 marked by coordinates on the first image I1

2b) detecting said point of origin of the reference pattern M1 marked by coordinates on the first distorted image I'1

2c) detecting said first points which are points of interest representative of the patterns of the first reference pattern M1 on the first image I1

2d) detecting first other points which are points of interest representative of the patterns of the first reference pattern M1 on the first distorted image I'1

2'a) detecting another physical or simulated point called the other point of origin Oi of the reference pattern Mi marked by coordinates on the second image I2, 2'b) detecting said other point of origin Oi of the reference pattern Mi marked by coordinates on the second distorted image I'2, 2'c) detecting the second points which are points of interest representative of the patterns of the reference pattern Mi on the second image I2

2'd) detecting the second other points which are points of interest representative of the patterns of the reference pattern Mi on the second distorted image I'2.

After or during detection, an ordering of the points of interest:

2e) the first points of interest being ordered with respect to the point of origin O1 located on the first image I1

2f) the first other points of interest being ordered with respect to the point of origin O1 located on the first distorted image I'1

2'e) the second points of interest being ordered with respect to the other point of origin Oi located on the second image I2

2'f) the second other points of interest being ordered with respect to the other point of origin Oi located on the second distorted image I'2.

And after or during ordering, the method comprises:

(automatically) forming first pairs and second pairs of the ordered points of interest, each first pair comprising a first point of interest and its offset first other point of interest, each second pair comprising a second point of interest and its offset second other point of interest.

The points of interest are selected from among:

points in intersecting lines between tiling patterns of the reference pattern M1 or Mi, especially corners of a checkerboard pattern, centroids of patterns forming an array of disjointed patterns of the reference pattern M1 or Mi.

Alternatively step 2) is based on digital image correlation, and comprises:

comparing image portions of the first image I1 with the first distorted image I'1 or conversely comparing distorted image portions of the first distorted image I'1 with the first image I1, preferably the first points are the centers C1 of the image portions and the first offset points are the centers C'1 of the distorted image portions.

comparing image portions of the second image with the second distorted image I'1 or conversely comparing distorted image portions of the first distorted image I'2 with the first image I2, the second points preferably being the centers of the image portions, the second offset points being the centers of the distorted image portions.

After or during step 2), the method comprises:

3) a step of determining, by calculation, a field of first apparent displacements, in pixels, between each first point and its first other offset point and a field of second apparent displacements, in pixels, between each second point and its corresponding second offset point.

After step 3) the method comprises:

4) a step of determining, by calculation, with the aid of the fields of the first and second apparent displacements, a field of simulated apparent displacements of points, for a distance L3 distinct from L1 and L2 of a pattern with the optical device.

The present invention is now described by means of examples that are solely illustrative and in no way limiting with respect to the scope of the invention, and on the basis of the attached illustrations, in which:

FIG. 1 shows a schematic front view of a glazing 100 for a motor vehicle, such as a windshield.

Figure 2:
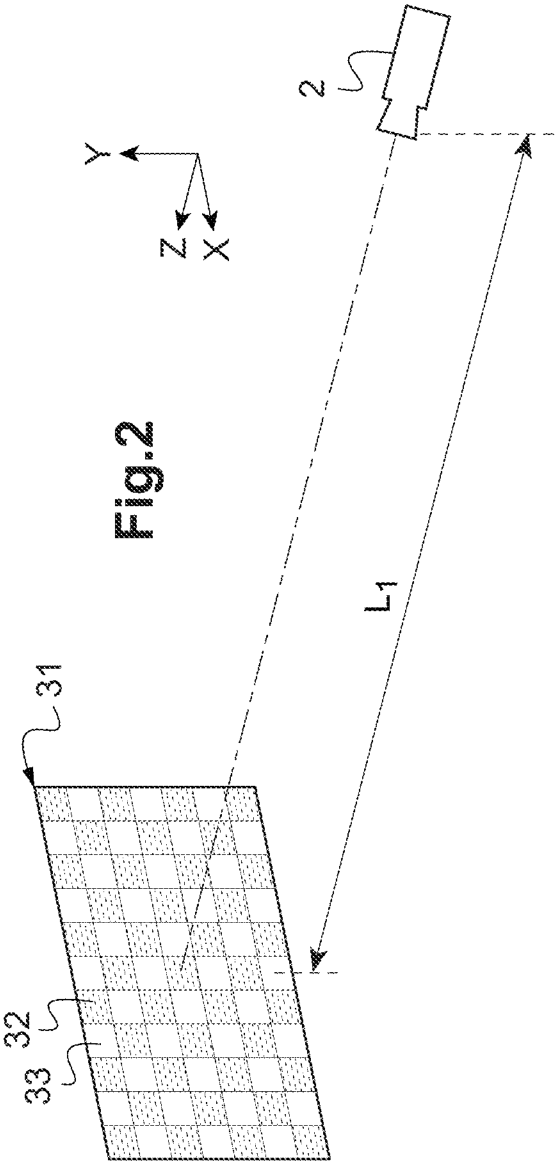

The following figures show a system for implementing a first step 1) of the method for analyzing the optical quality of the delimited region of the glazing according to a first aspect of the invention;

FIG. 2 or FIG. 2 is a schematic representation of the system for the implementation of a sub-step 1a) of the first step.

Figure 3:
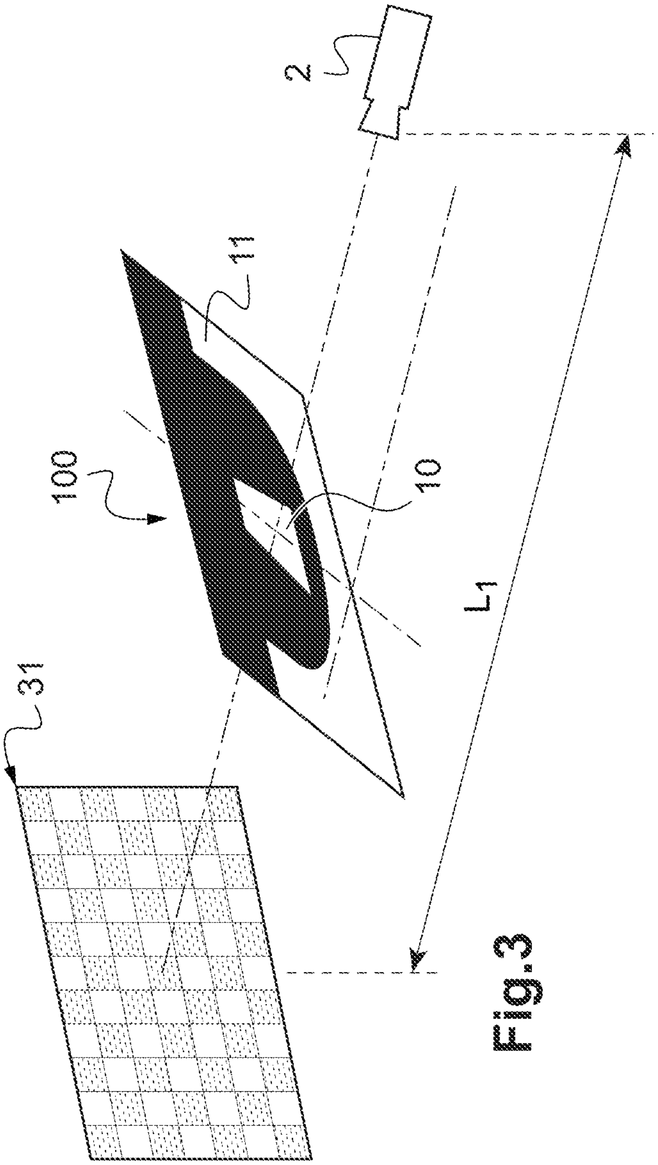

FIG. 3 or FIG. 3 is a schematic representation of the system for the implementation of a sub-step 1'a) of the first step.

Figure 4:
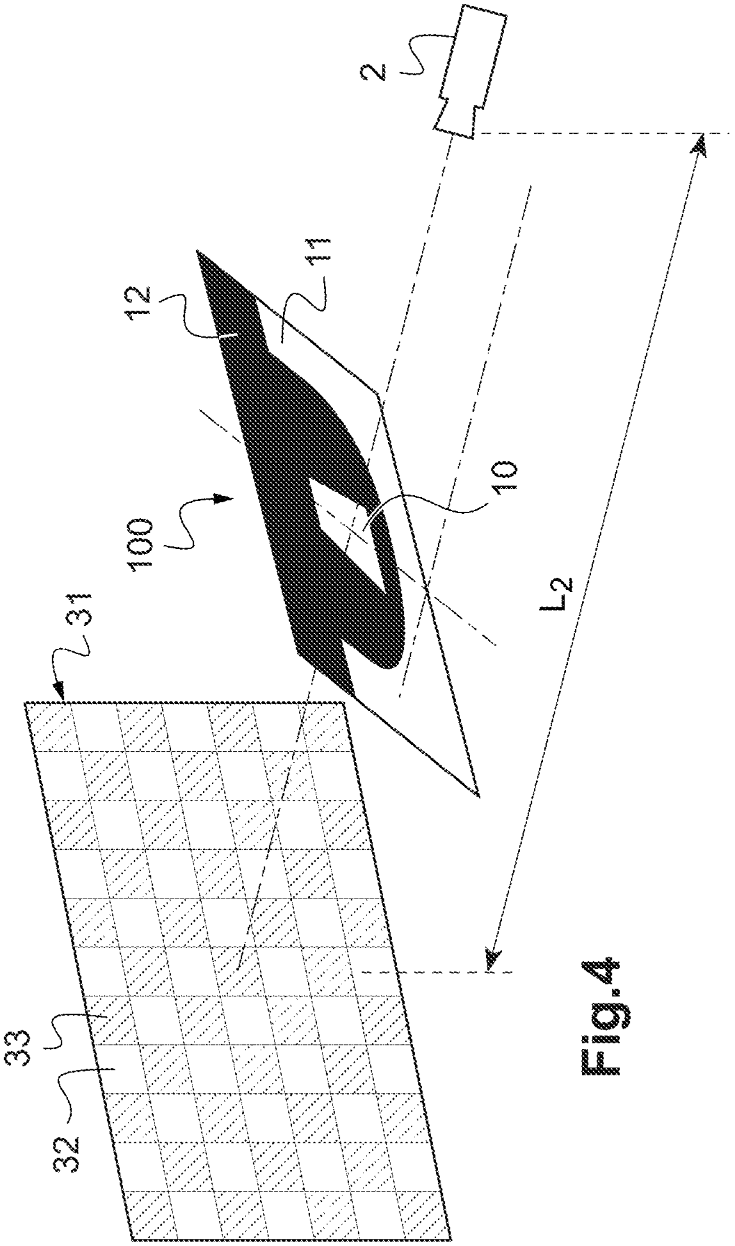

FIG. 4 or FIG. 4 is a schematic representation of the system for the implementation of a sub-step 1b) of the first step.

Figure 5:
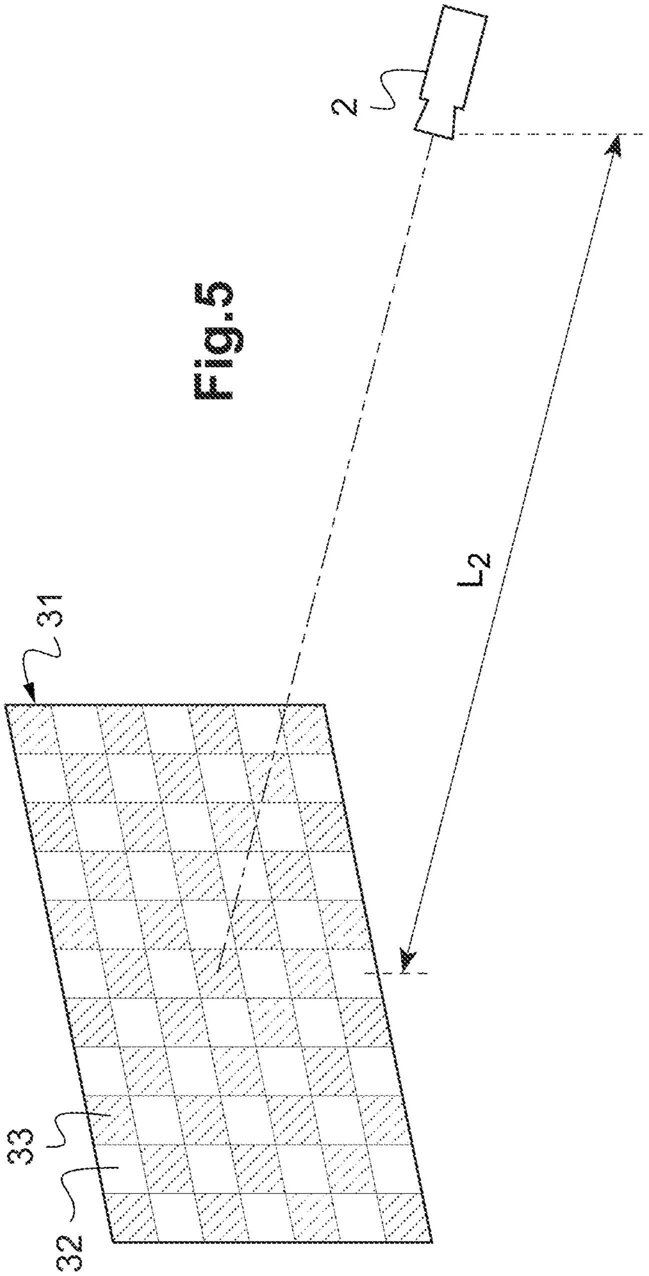

FIG. 5 or FIG. 5 is a schematic representation of the system for the implementation of a sub-step 1'*b*) of the first step.

Figure 6:
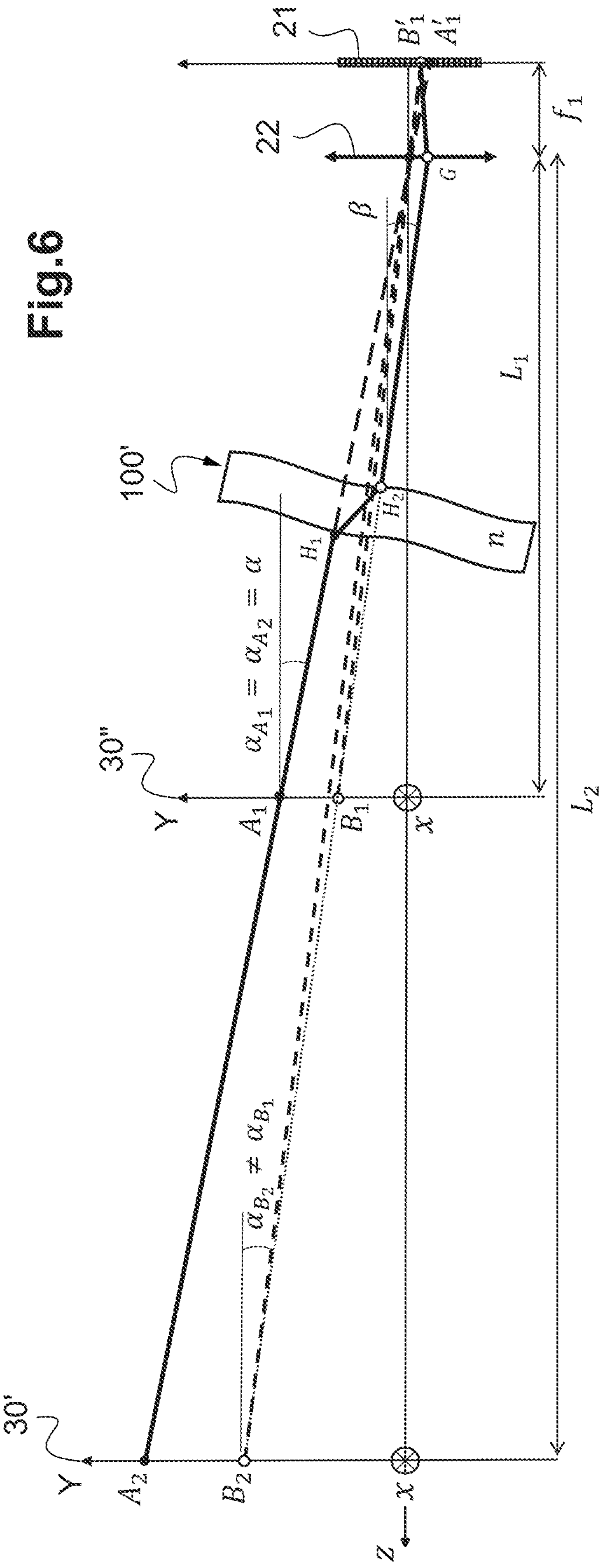

FIG. 6 or FIG. 6 is an explanatory schematic representation of the method according to the invention with a system of a first reference pattern M1 at L1 and a first reference pattern M1 (displaced) or M2 at L2.

Figure 7:
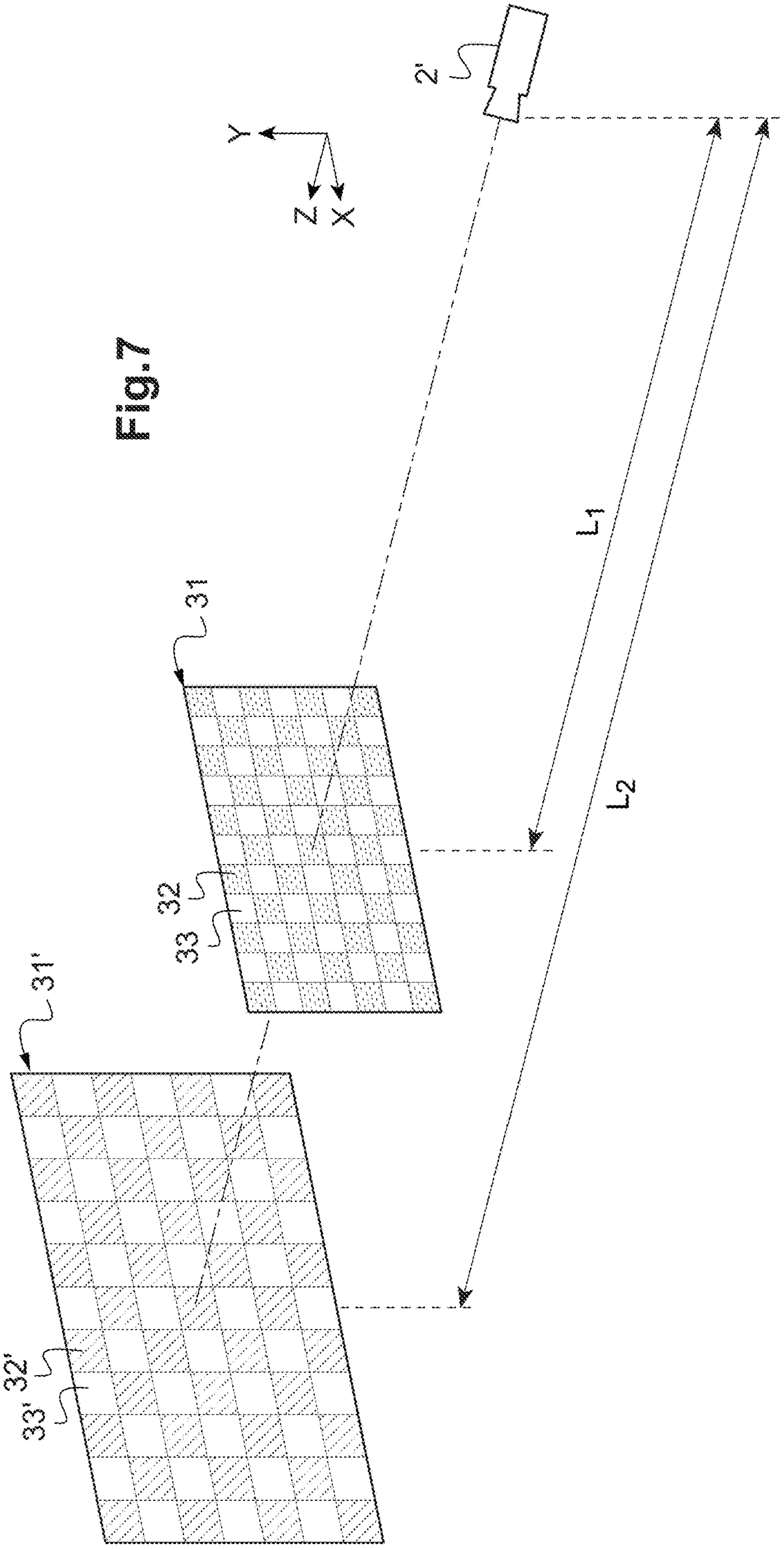

The following figures show a system for implementing a first step 1) of the method for analyzing the optical quality of the delimited region of the glazing according to a second aspect of the invention:

FIG. 7 or FIG. 7 is a schematic representation of the system for the implementation of a sub-step 1a) of the first step.

Figure 8:
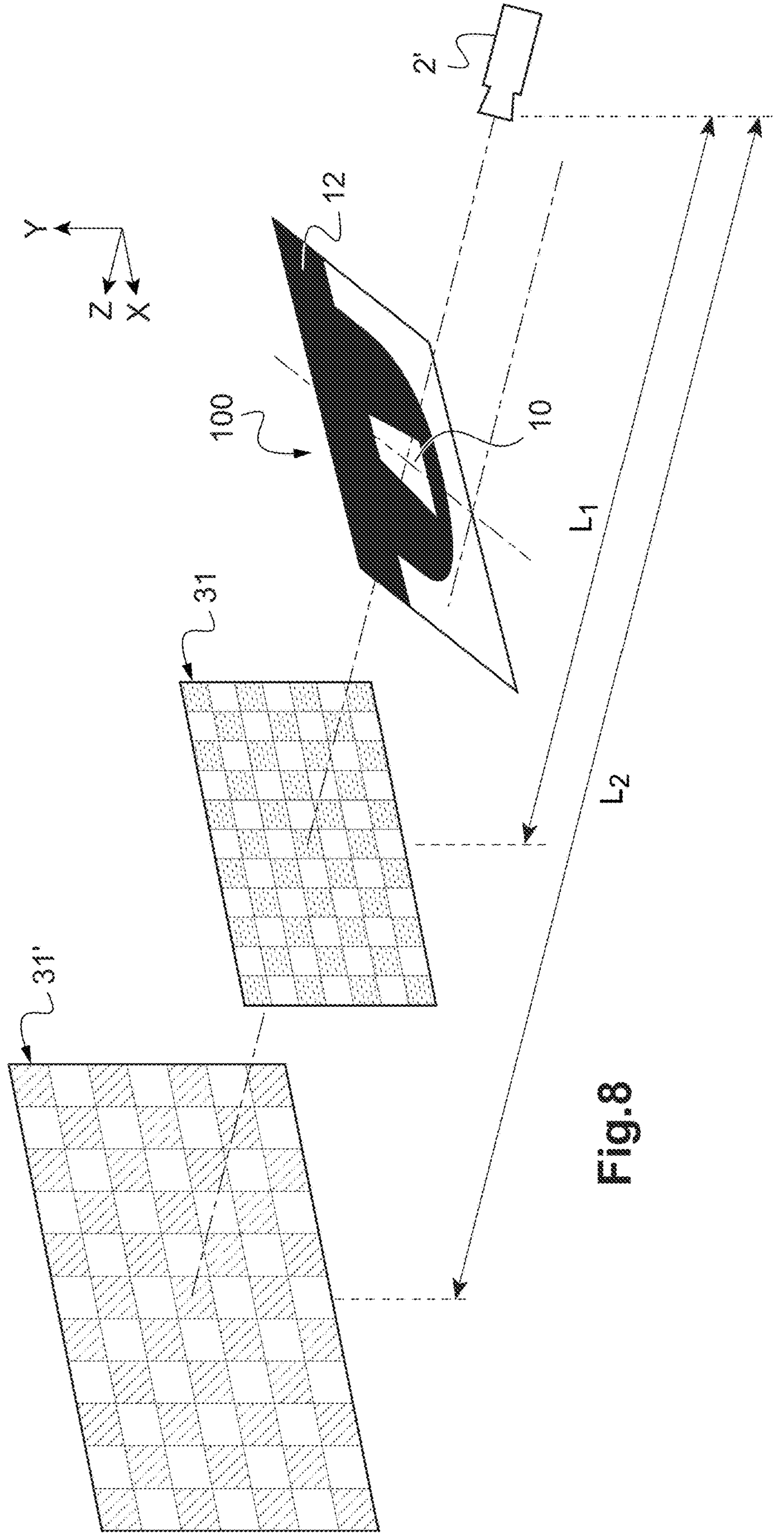

FIG. 8 or FIG. 8 is a schematic representation of the system for the implementation of a sub-step 1'a) of the first step.

Figure 9:
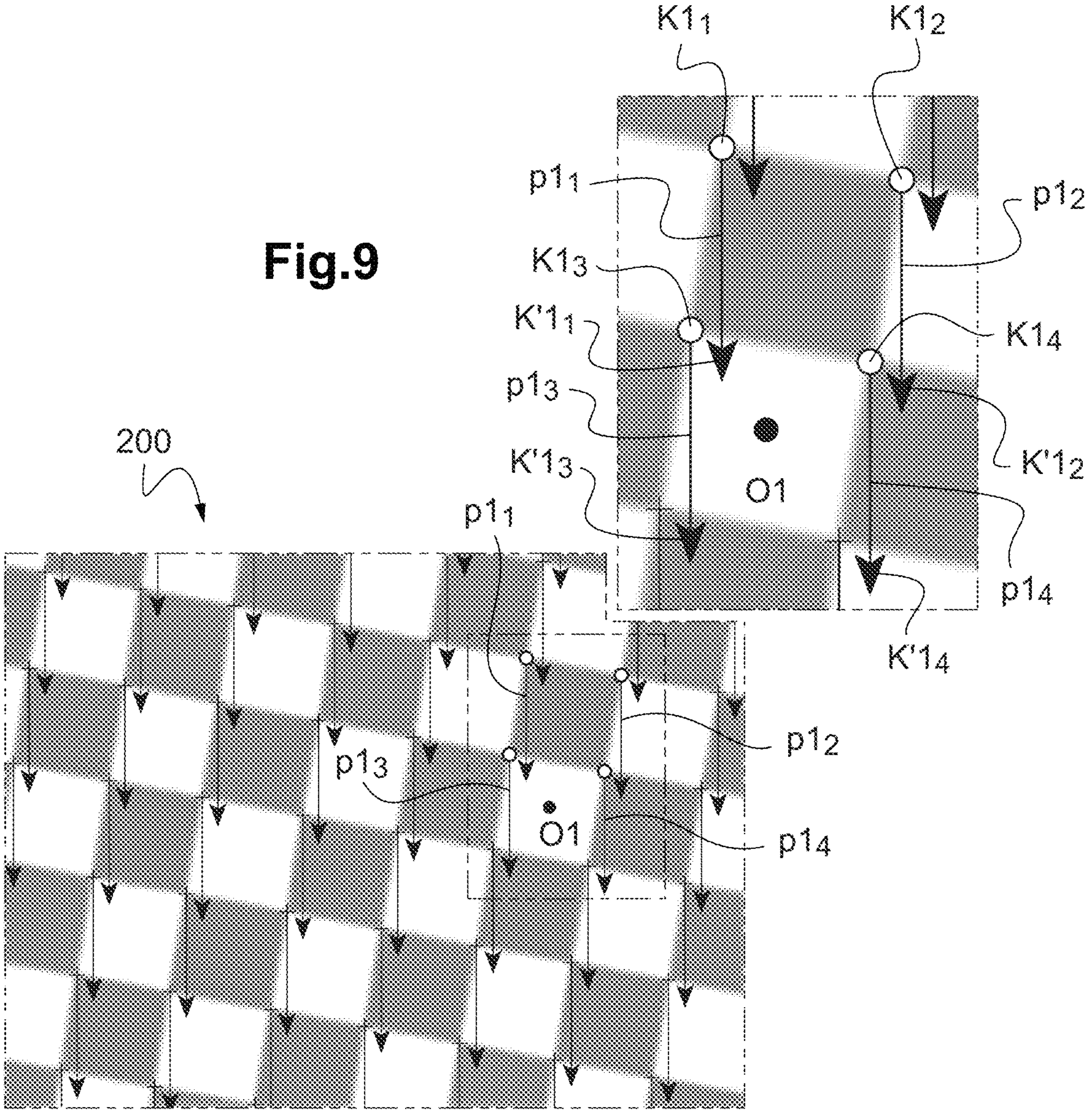

FIG. 9 or FIG. 9 is a schematic representation of a reference image with a field of first apparent displacements.

FIG. 10 or FIG. 10 is a map 301 of the interpolated first apparent displacements for L1 of 0.5 m.

FIG. 11 or FIG. 11 is a map of the interpolated second apparent displacements for L2 of 0.75 m.

FIG. 12 or FIG. 12 is a map of interpolated third apparent displacements for L3 of 1 m measured as experimental verification.

FIG. 13 or FIG. 13 is a predictive map of simulated apparent displacements for L3 of 1 m calculated from maps 301 and 302.

FIG. 14 or FIG. 14 is a map of the difference between the third apparent displacements and the simulated apparent displacements.

The following figures show the digital image correlation method used to arrive at step 3).

Figure 15:
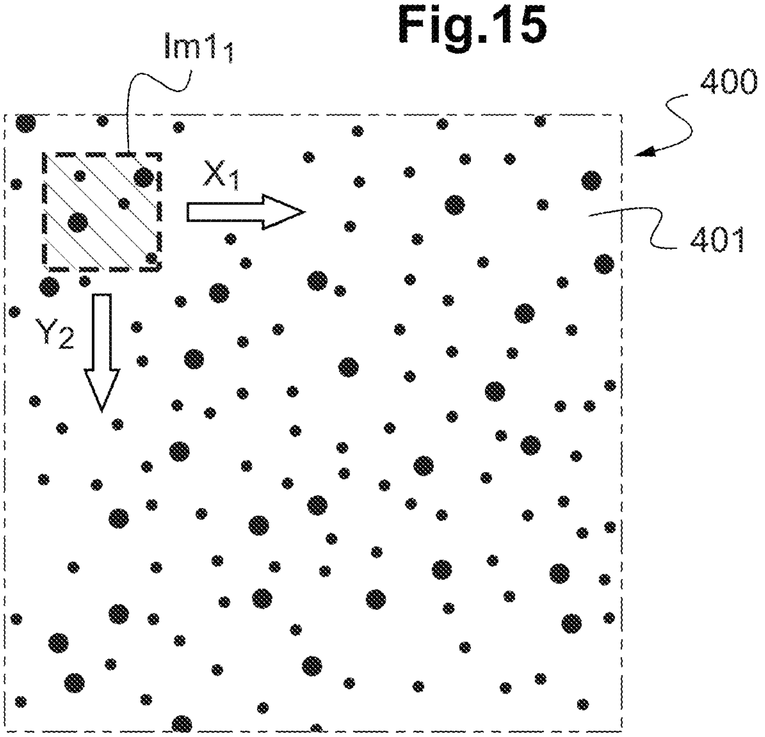

FIG. 15 or FIG. 15 shows a first reference image of a reference pattern M1 of random patterns (points) 401 and an image portion $Im1_1$ of the first distorted image I'1.

Figure 16:
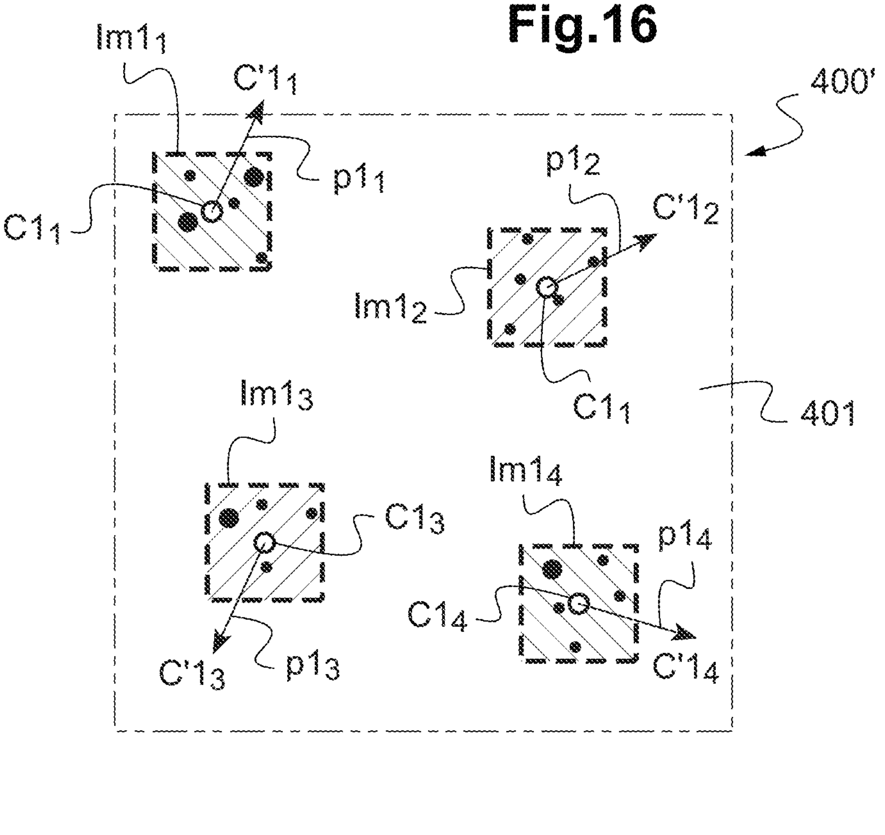

FIG. 16 or FIG. 16 shows a field of first displacements for four disjoint image portions of the first distorted image.

FIG. 17 or FIG. 17 is a schematic representation of a glazing comprising a delimited area to be placed in the optical path of an optical device such as a camera.

FIG. 18 or FIG. 18 is a schematic representation in side view of a glazing comprising a delimited area to be placed in the optical path of an optical device such as a camera.

FIG. 1 schematically represents a glazing 100 for a motor vehicle, such as a windshield.

The glazing 100 comprises a glass sheet 1 and an enamel strip 12. The enamel strip 12 forms a delimited area 10 to be placed in the optical path of an optical device, such as a camera in an advanced driver assistance system. The surface area of the delimited area is generally less than 0.5 $m^2$.

The enamel strip 12 may be disposed entirely on the surface of only one of the two main faces of the glass sheet 1, or it may be divided into several parts, each of the parts being disposed on one and the other of the faces of the glass sheet 1 and all of the parts together forming a delimited area 10. In the case of a multiple glazing comprising several glass sheets, such as a laminated glazing as, the enamel strip can also be formed from several parts, each part being arranged on the surface of two or more glass sheets depending on the number of parts, so as to form a delimited area.

The following figures show a system for implementing a first step 1) of the method for analyzing the optical quality of the delimited region of the glazing according to a first aspect of the invention.

FIG. 2 is a schematic representation of the system for the implementation of a sub-step 1a) of the first step, namely:

acquisition of a first reference image $I_1$ of a fixed (and illuminated) reference pattern M1 31 comprising a first set of (contrasting) patterns 32, 33 extending in two dimensions (X, Y orthogonal, in particular Y vertical axis), preferably 2D patterns—in particular on a first panel (in particular a plane) at a distance L1 of at least one centimeter and preferably of at most 5 m from an optical device for acquiring (digital) images 2 along the optical axis (Z) of the optical device, in particular at least 10, 50 or better still 100 patterns in the field of view.

FIG. 3 is a schematic representation of the system for implementing a sub-step 1'a) of the first step, namely the glazing 100 being placed between the optical device 2 and the first reference pattern M1 31, with said surface region in the field of view of the optical device, the acquisition of a first distorted image $I'_1$ of said first (physical) reference pattern M1, 31 at L1.

The (curved) glazing is inclined at a first angle preferably identical to the angle of the glazing or +/−5° or +/−1° when mounted in a vehicle.

FIG. 4 is a schematic representation of the system for implementing a sub-step 1'b) of the first step, namely the glazing 100 remaining placed between the optical device 2 and the first reference pattern M1 31, with said surface region in the field of view of the optical device, the acquisition of a second distorted image I'2 of said first (physical) reference pattern M1, 31 at a distance L2 distinct from L1 of the optical device 2, preferably L2-L1 in absolute value is at least 1 cm or 10 cm or 20 cm.

FIG. 5 is a schematic representation of the system for the implementation of a sub-step 1a) of the first step, namely the acquisition of a second reference image $I_2$ of the fixed (and illuminated) reference pattern M1 31 at distance L2 (absent glazing).

FIG. 6 is an explanatory schematic representation of the method according to the invention with a system 30" of a reference pattern M1 at L1 of the lens 22 and a system 30' at L2 of the first (moved) reference pattern M1 or the reference pattern M2 of the lens 22.

The points A1, A2 respectively represent real object points in the plane 30" at L1 or in the plane 30' at L2 as sources of a light ray forming an angle:

$$\alpha = \alpha_{A1} = \alpha_{A2} \quad \text{[Math 5]}$$

with respect to the optical axis Z (horizontal). In the absence of the transparent feature 100', this ray passes through the center of the lens 22 (approximated by a thin lens) to finally reach the image point A' on the detector 21.

The detector 21 is preferably positioned so that the focus is on the plane containing the real object A1 (respectively A2) at distance L1 (respectively L2), each plane preferably being successively in the field of view of the lens.

In the presence of the transparent feature 100', a ray coming from A1 or A2 or passing through A1 and A2 and forming an angle $$\alpha = \alpha_{A1} = \alpha_{A2} \quad \text{[Math 6]}$$

with respect to the optical axis Z is refracted in the transparent feature 100' between an entry point H1 and an exit point H2 and then passes through a point G on the lens 22 (approximated by a thin lens) to finally reach a point B'1 (respectively B'2) on the detector 21 at the focusing distance f1 (respectively f2). The case with A'1 and B'1 is shown in FIG. 6.

B1 and B2 are virtual object points, respectively contained in the planes at L1 and L2 of the lens 22 and representing the apparent positions of the real objects A1 and A2 due to refraction in the transparent feature 100'.

The angle with the optical axis Z (the horizontal) of the virtual ray at point Bi is denoted $\alpha_{B_i}$ where {i, j}∈{1,2}

The virtual points Bi are defined by their position $y_{B_i}$ where {i, j}∈{1,2}:

$$y_{B_i} = L_i \tan\alpha_{B_i} \quad \text{[Math 7]}$$

The angle β is defined as the angle of the light ray coming from A1 or A2 or passing through A1 and A2 after it passes through the transparent feature 100, that is, between points H2 and G. The ray will thus intercept the lens 22 at the point $y_G$:

$$y_G = y_{B_i} + L_i \tan\beta \quad \text{[Math 8]}$$

where {i,j}∈{1,2}

On detector 21, the points $A_i'$ and $B_i'$ are defined by their positions $y_{A}$, and $y_{B_i}$:

$$y_{B_i'} = \gamma_i y_{B_i} \quad \text{[Math 9]}$$

$$y_{A_i'} = \gamma_i y_{A_i} = \gamma_i L_i \tan\alpha \quad \text{[Math 10]}$$

$$p_i = (y_{B_i'} - y_{A_i'})/P \quad \text{[Math 11]}$$

P is the size of the physical pixel on the detector 21

$\gamma_1$ and $\gamma_2$ are the magnitudes defined by:

$$\gamma_1 = \frac{f_0}{f_0 - L_1} \quad \text{[Math 12]}$$

And $$\gamma_2 = \frac{f_0}{f_0 - L_2} \quad \text{[Math 13]}$$

with $f_0$ being the focal length of the lens.

$p_1$ being the first apparent displacement from A1 to B1

$p_2$ being the second apparent displacement from A2 to B2.

And:

$$p_1 = \frac{\gamma_1}{\gamma_2} p_2 + \frac{\gamma_1}{P}(L_2 - L_1)(\tan\beta - \tan\alpha) \quad \text{[Math 14]}$$

$$p_2 = \frac{\gamma_2}{\gamma_1} p_1 + \frac{\gamma_2}{P}(L_1 - L_2)(\tan\beta - \tan\alpha), \quad \text{[Math 15]}$$

Where tan β represents the effect of refraction in 100 of the ray from $A_i$ with an angle α.

$p_1$, $p_2$, $L_1$, $L_2$, $\gamma_1$, $\gamma_2$ and P are thus known or determined. Therefore, we find that:

$$\tan\beta = \tan\alpha + \frac{P}{L_1 - L_2}\left(\frac{p_2}{\gamma_2} - \frac{p_1}{\gamma_1}\right) \quad \text{[Math 16]}$$

A third distance L3 is then introduced, distinct from L1 and L2, for which we can define a third apparent displacement of a simulated reference pattern at this distance L3:

$$p_3 = \gamma_3\left(\frac{p_1}{\gamma_1} + \frac{L_3 - L_1}{L_2 - L_1}\left(\frac{p_2}{\gamma_2} - \frac{p_1}{\gamma_1}\right)\right) \quad \text{[Math 17]}$$

Where $$\gamma_3 = \frac{f_0}{f_0 - L_3} \quad \text{[Math 18]}$$

It is easy to generalize the apparent displacements pi in any pixel and the previous formula remains valid in any pixel when $p_1$ and $p_2$ describe the apparent displacement fields in any pixel.

The following figures show a system for implementing a first step 1) of the method for analyzing the optical quality of the delimited region of the glazing according to a second aspect of the invention.

FIG. 7 is a schematic representation of the system for implementing a simultaneous sub-step of 1a) and 1b) of the first step.

The two reference images are acquired at the same time thanks to adapted reference patterns M1, colored 31 with checkerboard 32, 32' and M2, colored 31' with checkerboard 32, 32', respectively at L1 and L2 (different colors).

M1 31 is closer to the RBG type optical device 2'.

FIG. 8 is a schematic representation of the system for implementing a simultaneous sub-step of 1'a) and 1'b) of the first step.

The two distorted images are acquired at the same time thanks to the adapted reference patterns M1 31 with checkerboard 32, 32' and M2 31' with checkerboard 32, 32'.

The glazing 100 is between the first reference pattern M1 31 and the optical device 2'.

FIG. 9 is a schematic representation 200 of a reference image (of a checkerboard of black and white patterns corresponding to the first reference pattern M1) with a field of apparent first displacements $p\mathbf{1}_i$ per pair of first points of interest ($K\mathbf{1}_i$ $K'\mathbf{1}_i$) which are the corners of the patterns.

Here, 4 pairs ($K\mathbf{1}_1$ $K'\mathbf{1}_1$) ($K\mathbf{1}_2$ $K'\mathbf{1}_{i2}$) ($K\mathbf{1}_{i3}$ $K'\mathbf{1}_{i3}$) ($K\mathbf{1}_{i4}$ $K'\mathbf{1}_{i4}$) are represented, with 4 apparent first displacements $p\mathbf{1}_1$ $p\mathbf{1}_2$ $p\mathbf{1}_3$ et $p\mathbf{1}_4$.

The point of origin O1 is also represented.

FIG. 10 is a map 301 of the interpolated first apparent displacements for L1 of 0.5 m.

The experimental conditions are as follows:

fo=16 mm, the sensor (photodetector) is matrix and 1624*1220 pixel size p of 4.4 μm.

The patterns of the checkerboard pattern M1 are 5.4 mm squares.

The glazing is inclined at 30° to the horizontal.

FIG. 11 is a map 302 of the interpolated second apparent displacements for L2 of 0.75 m.

The patterns of the checkerboard pattern M2 are 8.1 mm squares.

FIG. 12 is a map 303 of interpolated third apparent displacements for L3 of 1 m measured as experimental verification.

The patterns of the checkerboard pattern M2 are 10.8 mm squares.

FIG. 13 is a predictive map 304 of simulated apparent displacements for L3 of 1 m calculated from maps 301 and 302.

FIG. 14 is a map 305 of the difference between third apparent displacements and simulated apparent displacements.

The deviation is small enough to validate the method according to the invention.

The following figures show the digital image correlation method used to arrive at step 3).

FIG. 15 shows a first reference image 400 of a reference pattern M1 of random patterns (points) 401 and an image portion $Im\mathbf{1}_1$ of the first distorted image I'1 which is a sliding window on the first reference image until the best location of the image portion on the original image is found (calculation of the correlation function between the distorted image portion and portions of the reference image of equivalent size, the best location is defined by a maximum correlation function). The center point of this distorted image portion and the center point of the equivalent reference image portion are identified. The first apparent displacement is calculated between the two central points of the image portions.

FIG. 16 shows a first displacement field for four disjoint image portions of the first distorted image $Im\mathbf{1}_1$, $Im\mathbf{1}_2$, $Im\mathbf{1}_3$ et $Im\mathbf{1}_4$.

Each first apparent displacement $p\mathbf{1}_1$ $p\mathbf{1}_2$ $p\mathbf{1}_3$ $p\mathbf{1}_4$ is illustrated between the two center points ($C\mathbf{1}_1$, $C'\mathbf{1}_1$) ($C\mathbf{1}_2$, $C'\mathbf{1}_2$) ($C\mathbf{1}_3$, $C'\mathbf{1}_3$) ($C\mathbf{1}_4$, $C'\mathbf{1}_4$) of the image portions.

FIG. 17 is a schematic representation of a glazing 1000 comprising a delimited area 10 to be placed in the optical path of an optical device such as a camera.

The glazing 1000 incorporates a data storage device 2000 in the form of a data matrix or barcode that links to a database containing the simulated apparent displacement map. The data storage device is on said glazing printed peripherally in a resist of the enamel strip 12 on the glazing (on the inner side 11 for example).

FIG. 18 is a schematic side view of a glazing according to FIG. 17 comprising the delimited area placed in the optical path of an ADAS optical device such as a camera 2".

The delimited area is an area delimited by edges, in particular opaque edges, in particular edges formed by decorative features for concealing from view features of devices, such as embedded intelligent system devices, arranged behind the glazing.

The delimited area may have various shapes and/or comprises additional functional features depending on the use:

trapezoidal delimited area with an open bottom edge, area delimited in two parts, one in the form of a rectangle with rounded edges and the other, smaller, in the shape of a circle.

The circle-shaped part can for example be used for the installation of an additional device such as a rain sensor or an external light sensor. Alternatively, the rectangular portion with rounded edges further comprises a fading strip on its outer periphery.

The delimited area may comprise a heating feature on its surface to remove any fog or frost that may form on said surface and interfere with the acquisition of an opposing optical device.

Generally speaking, in the context of the invention, but without any limiting character, the delimited area of the glazing is an area delimited by at least two edges, preferably three edges.

The invention claimed is:

1. A method of analyzing an optical quality of a region of a glazing from analysis of images of a reference pattern, the method comprising:

1) A digital image acquisition step comprising:

acquiring at least one image of a first fixed reference pattern M1 comprising a first set of patterns extending in two dimensions, at an at least centimetric distance L1 from an optical device for image acquisition along an optical axis of the optical device, the acquiring of said at least one image of a first fixed reference pattern M1 comprising:

1a) providing a first reference image $I_1$, simulated or acquired, of the reference pattern M1, in an absence of said glazing, 1'a) the glazing being placed between the optical device and the first reference pattern M1, with said surface region in a field of view of the optical device, the acquisition of a first distorted image $I'_1$ of said first reference pattern M1, acquiring at least one image of a fixed reference pattern Mi selected from the first reference pattern M1 or another reference pattern M2 comprising a second set of patterns extending in two dimensions, the reference pattern Mi being at a distance L2 distinct from L1 of the optical device along the optical axis of the optical device, the acquiring of said at least one image of a fixed reference pattern Mi comprising:

1b) providing a second reference image $I_2$, simulated or acquired, of the reference pattern Mi, in the absence of said glazing, 1'b) the glazing being placed between the optical device and the reference pattern Mi, with said region in the field of view of the optical device, the acquisition of a second distorted image $I'_2$ of the reference pattern Mi, wherein after or as images are acquired 1), the method comprises:

2) a step of generating image points which are:

first points of the first reference pattern M1 on the first reference image $I_1$ corresponding to points of the first reference pattern M1, first other offset points of the first reference pattern M1 on the first distorted image I'1 corresponding to the same points of the first reference pattern M1, second points of the reference pattern Mi on the second reference image I2 corresponding to points of the reference pattern Mi, second other offset points of the second reference pattern M2 on the second distorted image I'2 corresponding to the same points of the reference pattern Mi, and wherein after or during step 2), the method comprises:

3) a step of determining, by calculation, a field of first apparent displacements, in pixels, between each first point and its corresponding first other offset point and a field of second apparent displacements, in pixels, between each second point and its corresponding second offset point, and wherein after step 3) the method comprises:

4) A step of determining, by calculation, with the fields of the first and second apparent displacements, a field of simulated apparent displacements of points, for a distance L3 distinct from L1 and L2 of a reference pattern with the optical device.

2. The method of analyzing the optical quality of a region of a glazing according to claim 1, wherein the sub-steps 1'a) and 1'b) are carried out without moving the glazing relative to the optical device and without moving the glazing and the optical device, the sub-steps 1'a) and 1'b) being at least successive.

3. The method of analyzing the optical quality of a region of a glazing according to claim 2, wherein sub-steps 1'a) and 1'b) are simultaneously performed when Mi is the second reference pattern M2.

4. The method of analyzing the optical quality of a region of a glazing according to claim 1, wherein Mi is the second reference pattern M2, where L2>L1, the first reference pattern M1 obscures the reference pattern M2, and the sub-steps 1b) and 1'b) are in an absence of M1.

5. The method of analyzing the optical quality of a region of a glazing according to claim 1, wherein Mi is the second reference pattern M2, the acquisitions of step 1) are in a presence of M1 and M2, the first distorted image I'1 containing patterns of color Co'1 and the second distorted image I'2 containing patterns of color Co'2 distinct from Co'1.

6. The method of analyzing the optical quality of a region of a glazing according to claim 5, wherein sub-steps 1'a) and 1'b) are performed simultaneously, wherein sub-steps 1a) and 1b) are performed simultaneously and wherein the first distorted image I'1 and the second distorted image I'2 are combined on a distorted common image I'1*c*, before step 3) the common image I'1*c* is segmented so as to obtain the images I'1 and I'2 and, if necessary, the first reference image I1 and the second reference image I2 are combined to form a common reference image I1*c* and, before step 3), the common image I1*c* is segmented so as to obtain the reference images I1 and I2.

7. The method of analyzing the optical quality of a region of a glazing according to claim 5, wherein the acquisitions of step 1) of the at least one image of a first fixed reference pattern M1 and of the at least one image of a fixed reference pattern Mi are successive or simultaneous acquisitions.

8. The method of analyzing the optical quality of a region of a glazing according to claim 1, wherein step 2) comprises a detection of points, 2a) detecting a physical or simulated point O1, the point of origin of the reference pattern M1 marked by coordinates on the first reference image I1, 2b) detecting said point of origin O1 of the first reference pattern M1 marked by coordinates on the first distorted image I'1, 2c) detecting said first points which are points of interest representative of the patterns of the first reference pattern M1 on the first reference image I1, 2d) detecting first other points which are points of interest representative of the patterns of the first reference pattern M1 on the first distorted image I'1, 2'a) detecting another physical or simulated point Oi, the point of origin of the reference pattern Mi marked by coordinates on the second reference image I2, 2'b) detecting said point of origin Oi of the reference pattern Mi marked by coordinates on the second distorted image I'2, 2'c) detecting the second points which are points of interest representative of the patterns of the reference pattern Mi on the second reference image I2, 2'd) detecting the second other points which are points of interest representative of the patterns of the reference pattern Mi on the second distorted image I'2, wherein after or during detection, performing an ordering of the points of interest:

2e) the first points of interest being ordered with respect to the point of origin O1 located on the first reference image I1, 2f) the first other points of interest being ordered with respect to the point of origin O1 located on the first distorted image I'1, 2'e) the second points of interest being ordered with respect to the point of origin Oi of the reference pattern Mi located on the second reference image I2, 2'f) the second other points of interest being ordered with respect to the point of origin Oi of the reference pattern Mi located on the second distorted image I'2, and wherein after or during the ordering of the points of interest, the method comprises:

automatically forming first pairs and second pairs of the ordered points of interest, each first pair comprising a first point of interest and its offset first other point of interest, each second pair comprising a second point of interest and its offset second other point of interest.

9. The method of analyzing the optical quality of a region of a glazing according to claim 6, wherein the points of interest are selected from among:

points in intersection lines of a grid reference pattern or between tiling patterns of the reference pattern M1 or Mi, or centroids of patterns forming an array of disjointed patterns of the first reference pattern M1 or Mi.

10. The method of analyzing the optical quality of a region of a glazing according to claim 9, wherein the points of interest are corners of a checkerboard pattern.

11. The method of analyzing the optical quality of a region of a glazing according to claim 6, wherein step 2) comprises a sub-pixel detection of points.

12. The method of analyzing the optical quality of a region of a glazing according to claim 1, wherein step 2) is based on a correlation of digital images, and comprises:

comparing image portions of the first reference image I1 with the first distorted image I'1 or conversely comparing distorted image portions of the first distorted image I'1 with the first reference image I1, or comparing image portions of the second reference image with the second distorted image I'1 or conversely comparing distorted image portions of the second distorted image I'2 with the second reference image I2, the second offset points are centers of the distorted image portions.

13. The method of analyzing the optical quality of a region of a glazing according to claim 12, wherein the first points are the centers of the reference image portions of the first and second reference images and the first offset points are the centers of the distorted image portions and the second points are the centers of the reference image portions.

14. The method of analyzing the optical quality of a region of a glazing according to claim 1, comprising a predictive mapping in any pixel of the simulated apparent displacements.

15. The method of analyzing the optical quality of a region of a glazing according to claim 9, wherein the calculation of each simulated apparent displacement p3 at any pixel is obtained from the following formula:

$$p_3 = \gamma_3\left(\frac{p_1}{\gamma_1} + \frac{L_3 - L_1}{L_2 - L_1}\left(\frac{p_2}{\gamma_2} - \frac{p_1}{\gamma_1}\right)\right)$$

wherein $\gamma_1$ $\gamma_2$ and $\gamma_3$ are the magnitudes defined by:

$$\gamma_1 = \frac{f_0}{f_0 - L_1},$$

$$\gamma_2 = \frac{f_0}{f_0 - L_2}, \text{ and}$$

$$\gamma_3 = \frac{f_0}{f_0 - L_3}$$

fo being the focal length of the optical device $p_1$ being the first apparent displacement at any pixel $p_2$ being the second apparent displacement at any pixel.

16. A method of calibrating an optical camera placed in a passenger compartment of a vehicle in a field of view of a region of said glazing forming a camera zone, said calibration using the mapping of simulated apparent displacements according to claim 14.

17. A vehicle comprising the glazing and a calibrated camera according to claim 16.

18. A road or rail vehicle glazing, comprising a data storage device in the form of a data matrix or a bar code which refers to a database containing the simulated apparent displacement mapping for the glazing, the simulated apparent displacement mapping being obtained by performing the method according to claim 14.

19. A vehicle comprising the road or rail vehicle glazing according to claim 18, and a device for acquiring images in a passenger compartment of the vehicle, the device comprising an optical camera positioned to receive light radiation passing through the glazing through said region forming a camera zone, the camera being selected from among: a visible light camera, a Near Infrared LIDAR camera or a thermal camera.

20. The method of analyzing the optical quality of a region of a glazing according to claim 1, wherein step 1a) comprises providing the first reference image $I_1$, simulated or acquired, of the reference pattern M1 in the field of view of the optical device, in an absence of said glazing, and wherein step 1b) comprises providing the second reference image $I_2$, simulated or acquired, of the reference pattern Mi in the field of view of the optical device, in the absence of said glazing.

* * * * *